United States Patent
Tanigawa (10) Patent No.: US 7,683,972 B2
(45) Date of Patent: Mar. 23, 2010

(54) VIDEO SIGNAL PROCESSING APPARATUS WHICH GENERATES PLURAL CLOCKS AND PERFORMING VIDEO SIGNAL PROCESSING USING THE PLURAL CLOCKS

(75) Inventor: Satoru Tanigawa, Kawanishi (JP)

(73) Assignee: Panasonic Corporation, Osaka (JP)

( * ) Notice: Subject to any disclaimer, the term of this patent is extended or adjusted under 35 U.S.C. 154(b) by 1067 days.

(21) Appl. No.: 11/357,209

(22) Filed: Feb. 21, 2006

(65) Prior Publication Data
US 2006/0187349 A1    Aug. 24, 2006

(30) Foreign Application Priority Data
Feb. 23, 2005    (JP)    ................................ 2005-048061

(51) Int. Cl.
*H03L 7/00* (2006.01)
*H04N 5/04* (2006.01)
*H04N 7/00* (2006.01)

(52) U.S. Cl. ........................ 348/536; 348/497; 348/511; 348/537

(58) Field of Classification Search ................ 348/497, 348/511, 533, 536, 537, 540–542, 547, 714–716, 348/718, 498, 458; 386/13, 84, 85, 88–91
See application file for complete search history.

(56) References Cited

U.S. PATENT DOCUMENTS

| 3,909,839 | A | * | 9/1975 | Inaba et al. ................. 348/498 |
| 4,212,027 | A | * | 7/1980 | Lemoine ...................... 348/498 |
| 4,214,262 | A | * | 7/1980 | Mizukami ................... 348/498 |
| 4,373,168 | A | * | 2/1983 | Mizukami et al. ........... 348/498 |
| 4,922,118 | A | * | 5/1990 | Maeshima ................... 348/458 |
| 5,021,873 | A | * | 6/1991 | Abumi ........................ 348/560 |
| 5,349,385 | A | * | 9/1994 | Glenn ......................... 348/458 |
| 5,359,366 | A | * | 10/1994 | Ubukata et al. ............. 348/536 |
| 5,541,665 | A | * | 7/1996 | Urata et al. ................. 348/571 |
| 5,812,210 | A | | 9/1998 | Arai et al. |
| 6,020,927 | A | * | 2/2000 | Tanaka et al. ............... 348/458 |
| 6,211,918 | B1 | * | 4/2001 | Uwabata et al. ............. 348/458 |
| 6,285,402 | B1 | * | 9/2001 | Miyazaki et al. ............ 348/445 |
| 6,335,760 | B1 | | 1/2002 | Sato |
| 6,380,979 | B1 | * | 4/2002 | Tokoi et al. ................. 348/458 |

FOREIGN PATENT DOCUMENTS

JP    2000-312328    11/2000

* cited by examiner

*Primary Examiner*—Victor Kostak
(74) *Attorney, Agent, or Firm*—Wenderoth, Lind & Ponack, L.L.P.

(57) ABSTRACT

A video signal processing apparatus is provided with a first clock generation circuit for generating a first clock synchronized with an input signal; a second clock generation circuit for receiving a set value to be a reference of an output frequency, adding the set value for every reference clock, extracting data according to the cumulative value, converting the data into an analog signal, reducing quantization noise, and multiplying the analog signal, thereby to obtain a second clock; and a clock switch circuit for generating a sync signal that is switched to the second clock, by using a sync signal generated with the first clock; and video signal processing is carried out using the second clock that is generated according to the resolution of a pixel display.

5 Claims, 7 Drawing Sheets

VIDEO SIGNAL PROCESSING APPARATUS WHICH GENERATES PLURAL CLOCKS AND PERFORMING VIDEO SIGNAL PROCESSING USING THE PLURAL CLOCKS

FIELD OF THE INVENTION

The present invention relates to a video signal processing apparatus and, more particularly, to a video signal processing apparatus which is provided with a clock generation circuit for generating clocks for a pixel display unit and a subsequent-stage system, and is constituted by plural clocks when performing video signal processing.

BACKGROUND OF THE INVENTION

In recent years, various resolutions have appeared for pixel display units such as a liquid crystal panel and a PDP, and the clock frequency for driving such panel differs from panel to panel. In a clock generation circuit or a video signal processing which can generate a clock according to the clock frequency for operating a panel, it is necessary to display video on a pixel display unit after switching to the clock frequency of the panel.

For example, in a clock generation circuit of a conventional video signal processing apparatus described in Japanese Published Patent Application No. 2000-312328 (Patent Document 1), a circuit for frequency-dividing an input clock is constituted, or a counter circuit starts operation at every reset, and a decoded value of the counter circuit is outputted as a clock.

Hereinafter, the clock generation circuit in the conventional video signal processing apparatus will be described.

Figure 7:
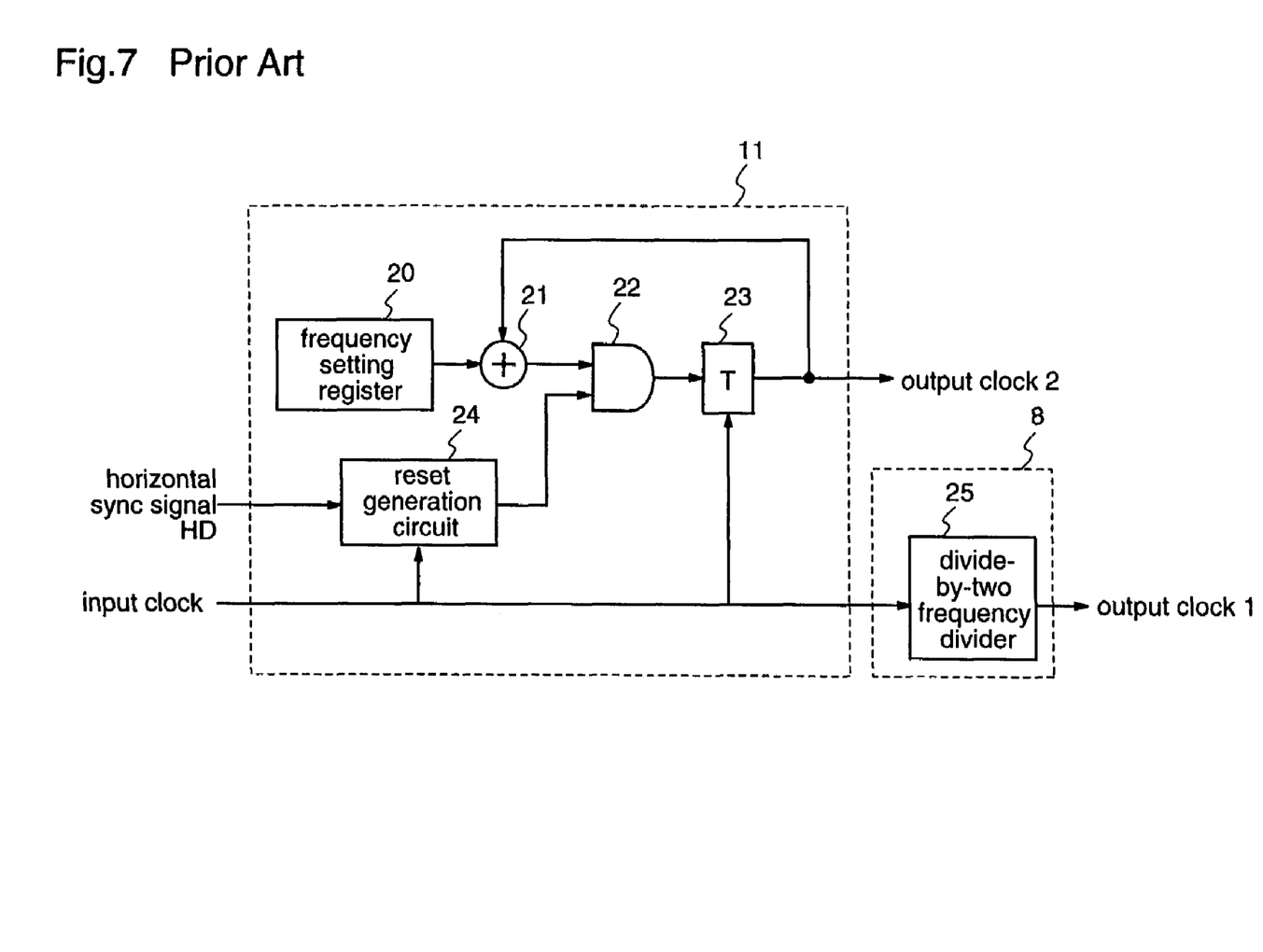
FIG. 7 is a block diagram illustrating the structure of a clock generation circuit in a conventional video signal processing apparatus.

FIG. 7 is a block diagram illustrating the clock generation circuit in the conventional video signal processing apparatus disclosed in Patent Document 1.

With reference to FIG. 7, the clock generation circuit has a first clock generation circuit comprising a divide-by-two frequency divider 25, and a second clock generation circuit 11 comprising a frequency setting register 20, an addition circuit 21, an AND gate 22, a flip-flop 23, and a reset generation circuit 24.

The frequency setting register 20 has a predetermined set value, and varies the set value to vary the frequency of the output clock so that the frequency of the output clock becomes smaller than the frequency of the input clock.

A counter comprises the addition circuit 21, the AND gate 22, and the flip-flop 23, and the count value of the counter is reset by a horizontal sync signal as a reset signal.

Hereinafter, the operation of the clock generation circuit constituted as described above will be described.

In the first clock generation circuit 8, a clock which is frequency-divided by two using the frequency divider 25 that is operated at the rising timing of the input clock is regarded as an output clock 1. Further, in the second clock generation circuit 11, the reset generation circuit 24 generates a reset signal from the supplied horizontal sync signal HD, at the rising timing of the input clock which is a reset input to the circuit 24 and, at this timing, the value of the frequency setting register 20 is added to the output clock 2 by the adder 21 to perform counting, and the most significant bit of the count value is used as the output clock 2 through the AND gate 22 and the latch 23, thereby varying the frequency of the output clock. The output clock 1 generated by the first clock generation circuit 8 and the output clock 2 generated by the second clock generation circuit 11 have difference numbers of cycles in one horizontal scanning period, and data are written by the output clock 1 generated by the first clock generation circuit 8 while the data are read by the output clock 2 generated by the second clock generation circuit 11.

In the clock generation circuit of the conventional video signal processing circuit, however, when resetting the counter with the reset signal which is generated by the horizontal sync signal at the clock outputted from the second clock generation circuit, if a horizontal sync signal that is an integer multiple of the cycle of the output clock is not inputted or if the input clock is a non-standard signal having a deteriorated sync signal such as VTR, the length of the clock cycle is undesirably shortened or the ratio between the Low period and the High period of the clock, i.e., the duty ratio, undesirably loses accuracy. Therefore, when the conventional clock generation circuit is applied to the video signal processing apparatus, in the processing circuit that is operated with the second clock, a timing error occurs in a combination circuit due to the short clock cycle, leading to outputting of unexpected data.

Further, in the clock generation circuit of the conventional video signal processing circuit, since the count value is reset by the horizontal sync signal, the length of the clock cycle is undesirably shortened depending on the timing at which the horizontal sync signal is inputted, leading to discontinuous output clocks.

Furthermore, in the clock generation circuit of the conventional video signal processing apparatus, it is necessary to input a high-frequency clock as an input clock. Therefore, when the clock frequency for driving a liquid crystal panel exceeds 80 MHz or 100 MHz, it is necessary for the clock oscillator to input a clock of a frequency higher than that of the panel driving clock, resulting in a noise source as well as an increase in power consumption. Accordingly, the conventional clock generation circuit is not practical.

Moreover, it may be thought that the second clock is generated from the horizontal sync signal using a high-power multiply PLL circuit. In this case, the frequency of the horizontal sync signal varies depending on the input video signal, and the output frequency differs from panel to panel, and therefore, the range of output frequencies should be secured broadly. Accordingly, it is necessary to perform verification with many combinations when a high-power multiply PLL is designed, leading to a lot of time required for designing. Further, it is difficult to reduce jitters of clocks, and redesign is needed at every miniaturization of semiconductor processing.

SUMMARY OF THE INVENTION

The present invention is made to solve the above-described problems and has for its object to provide a clock generation apparatus which can keep the cycle of a clock frequency constant independent of a sync signal, and can generate a clock in accordance with clock frequencies for a subsequent-stage system and a pixel display while maintaining the duty.

It is another object of the present invention to provide a video signal processing apparatus which performs video signal processings using the clock generated by the clock generation apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a video signal processing apparatus comprising: a first clock generation circuit for generating a first clock synchronized with an input signal; a first video signal processing circuit for performing video signal processing using the first clock; a second clock generation circuit for generating a second clock according to a resolution of a pixel display; a writing control circuit for controlling writing of data into a memory by the first clock; a clock switch circuit for generating a sync signal that is switched to the second clock, using the sync signal generated with the first clock; a reading control circuit for controlling reading of data outputted from the memory, using the second clock; and a second video signal processing circuit for performing video signal processing using the second clock. Therefore, it is possible to generate optimum clocks for a pixel display.

According to a second aspect of the present invention, there is provided a video signal processing apparatus comprising: a first clock generation circuit for generating a first clock synchronized with an input signal, using a reference clock outputted from a clock oscillation circuit; a first video signal processing circuit for performing video signal processing using the first clock; a second clock generation circuit for generating a second clock according to a resolution of a pixel display; a third clock generation circuit for generating a third clock by multiplying the reference clock by M (M: integer); a first writing control circuit for controlling writing of data into a first memory by the first clock; a first clock switch circuit for generating a sync signal that is switched to the third clock, using the sync signal generated with the first clock; a first reading control circuit for controlling reading of data from the first memory by the third clock; a third video signal processing circuit for performing video signal processing using the third clock; a second writing control circuit for controlling writing of data into the second memory by the third clock; a second clock switch circuit for generating a sync signal by switching the sync signal generated by the first clock to the second clock; a second reading control circuit for controlling reading of data from the second memory by the second clock; and a second video signal processing circuit for performing video signal processing using the second clock. Therefore, even when a difference in clock frequencies between the input and the output is increased, the video signal can be processed with changing the resolution in the vertical direction by relaying the third clock.

According to a third aspect of the present invention, there is provided a video signal processing apparatus comprising: a first clock generation circuit for generating a first clock synchronized with an input signal, using a first reference clock outputted from a clock oscillation circuit; a first video signal processing circuit for performing video signal processing using the first clock; a second clock generation circuit for generating a second clock according to a resolution of a pixel display; a third clock generation circuit for generating a third clock by multiplying a second reference clock outputted from a second clock oscillation circuit by L (L: integer); a first writing control circuit for controlling writing of data into a first memory by the first clock; a first clock switch circuit for generating a sync signal that is switched to the third clock, using the sync signal generated with the first clock; a first reading control circuit for controlling reading of data from the first memory by the third clock; a third video signal processing circuit for performing video signal processing using the third clock; a second writing control circuit for controlling writing of data into the second memory by the third clock; a second clock switch circuit for generating a sync signal that is switched to the second clock, using the sync signal generated by the first clock; a second reading control circuit for controlling reading of data from the second memory by the second clock; and a second video signal processing circuit for per-forming video signal processing using the second clock. Therefore, the third clock frequency can be fine-adjusted regardless of the reference clock that is used when generating the first clock.

According to a fourth aspect of the present invention, in the video signal processing apparatus defined in any of Claims 1 to 3, the second clock generation circuit comprises: an accumulation circuit for inputting a set value as a reference of an output frequency, and adding the set value for each reference clock; a memory for previously storing sinusoidal data or periodical data, and taking out the data according to an output value of the accumulation circuit; a D/A converter for converting the output data from the memory into an analog signal; a filter processing circuit for reducing quantization noise in the analog signal; and a multiply circuit for multiplying, by N (N: integer), a signal which has periodicity and is output from the filter processing circuit; and the second clock generation circuit generates a second clock. Therefore, when a reference clock is inputted, sinusoidal waveform data is outputted from a ROM in accordance with a set value of a register, regardless of a reset signal, and thereby the duty of the clock is not likely to change dependent on the count value, resulting in constant supply of stable clocks.

As described above, a clock generation circuit in a video signal processing apparatus according to the present invention can easily generate clocks for pixel display and subsequent-stage processings by inputting a set value corresponding to the clock frequency of the pixel display. Further, even when a non-standard signal of VTR or the like is inputted, the cycles of clocks to be used for processings after memory reading are not shortened, and the cycles can be kept constant, thereby avoiding timing errors in video processing using the clocks corresponding to the clock frequencies for the pixel display and the subsequent-stage processings.

Further, in the video signal processing apparatus according to the present invention, it is possible to constitute a system which does not use a high-power multiply PLL that requires a lot of man-hours for designing and verification when generating a clock corresponding to a clock frequency of a pixel display, and further, it is possible to establish a video signal processing system which requires no considerations on influences by jitter and the like.

BRIEF DESCRIPTION OF THE DRAWINGS

FIG. 2(*a*) is a block diagram illustrating the structure of a clock switch circuit in the video signal processing apparatus according to the first embodiment.

FIG. 2(*b*) is a diagram illustrating waveforms of signals which are inputted and outputted to/from the clock switch circuit in the video signal processing apparatus according to the first embodiment.

FIG. 4(*a*) is a timing chart illustrating an example of operation of the clock generation circuit in the video signal processing apparatus according to the first embodiment.

FIG. 4(*b*) is a timing chart illustrating another example of operation of the clock generation circuit in the video signal processing apparatus according to the first embodiment.

DETAILED DESCRIPTION OF THE PREFERRED EMBODIMENTS

Embodiment 1

Figure 1:
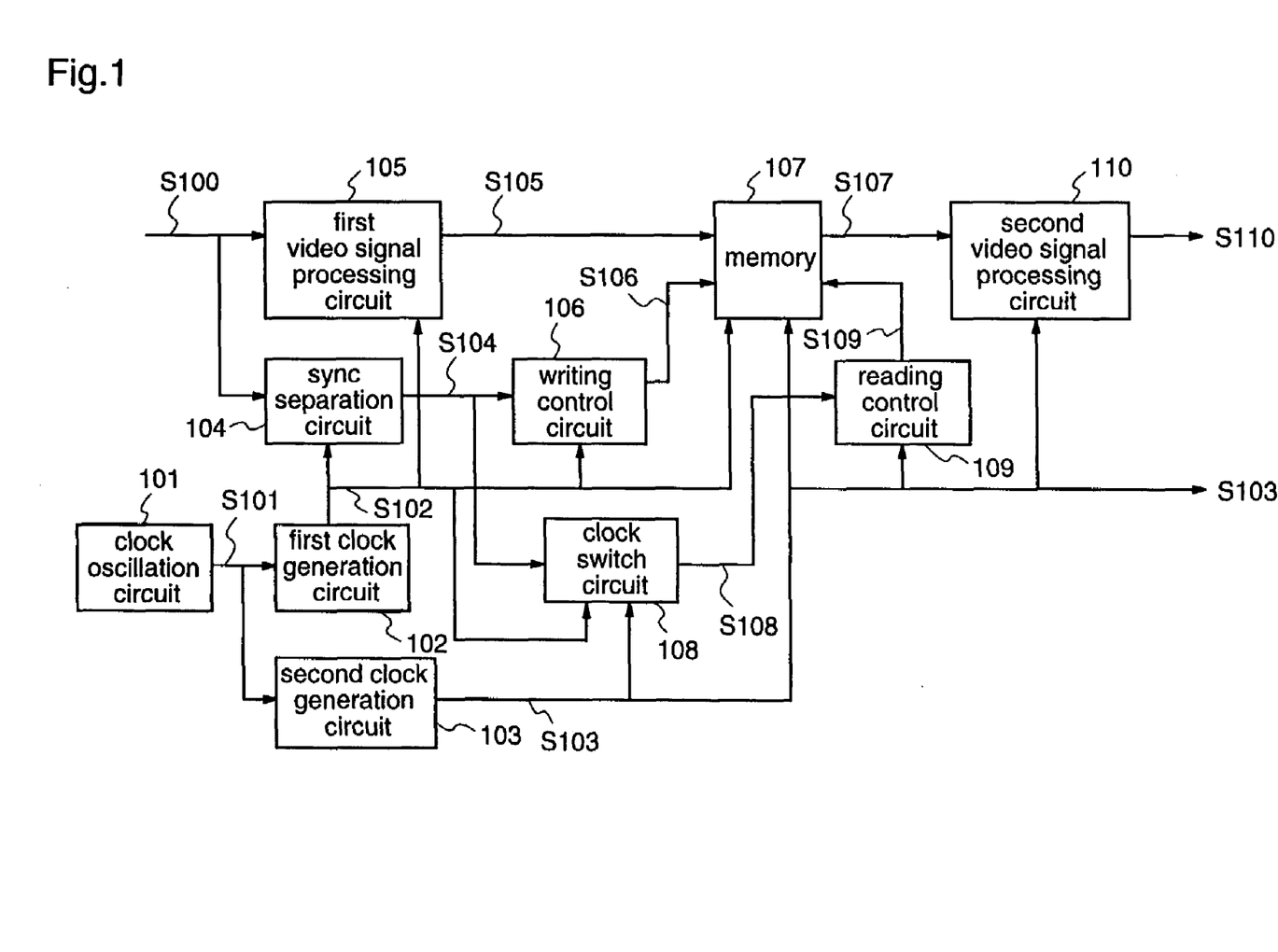
FIG. 1 is a block diagram illustrating the whole structure of a video signal processing apparatus according to a first embodiment of the present invention.

FIG. 1 is a block diagram illustrating the construction of a video signal processing apparatus according to a first embodiment of the present invention.

With reference to FIG. 1, the video signal processing apparatus comprises a clock oscillation circuit 101, a first clock generation circuit 102, a second clock generation circuit 103, a sync separation circuit 104, a first video signal processing circuit 105, a writing control circuit 106, a memory 107 capable of controlling writing and reading with different clocks, a sync signal clock switch circuit 108, a reading control circuit 109, and a second video signal processing circuit 110.

The clock oscillation circuit 101 oscillates a reference clock S101 using crystal or the like. The reference clock S101 is input to the first clock generation circuit 102. When the inputted video signal S100 includes a burst signal, the first clock generation circuit 102 locks the phase to the burst signal to output a 4 fsc clock (first clock) having a frequency four times as high as a chrominance subcarrier frequency fsc. The 4 fsc clock S102 is connected to the sync separation circuit 104, the first video signal processing circuit 105, the writing control circuit 106, the writing clock of the memory 107, and the clock switch circuit 108.

The reference clock S101 is also input to the second clock generation circuit 103, and the second clock generation circuit S103 generates clocks for processings after memory reading as well as a second clock 103 for panel driving.

The second clock S103 is connected to the reading clock of the memory 107, the clock switch circuit 108, the reading control circuit 109, and the second video signal processing circuit 110, and is output to the outside for driving a panel or the like. The inputted video signal S100 is input to the sync separation circuit 104, and the sync separation circuit 104 outputs a horizontal sync signal S104 that is synchronized with the inputted video signal. On the other hand, the inputted video signal S100 is also input to the first video signal processing circuit 105. In the first video signal processing circuit 105, the video signal is processed by a YC separator for separating a composite video signal into a luminance signal and a chrominance signal, a chrominance demodulation circuit for demodulating the chrominance signal into color-difference signals, and a skew correction circuit for correcting jitters in the burst clock, and consequently, the video signal S105 is outputted.

The writing control circuit 106 controls the memory writing position by the horizontal sync signal S104, and writes the video signal S105 into the memory 107 according to a writing control signal S106. Further, the horizontal sync signal S104 is switched to the second clock S103 by the clock switch circuit 108.

The clock switch circuit 108 performs differentiation using the second clock S103 that is closest to a rising edge or a falling edge of the inputted sync signal so that the result of differentiation becomes one-clock width of the second clock S103, and the horizontal sync signal S108 that is switched to the second clock S103 is input to the reading control circuit 109 and then delayed so that memory writing and memory reading do not overlap, and thereafter, the video signal S107 is read from the memory 107 with the second clock S103. The video signal S107 read from the memory 107 is subjected to video processing and adjustment by the second video signal processing circuit 110, and consequently, the video signal S110 is outputted.

Figures 2A, 2B:
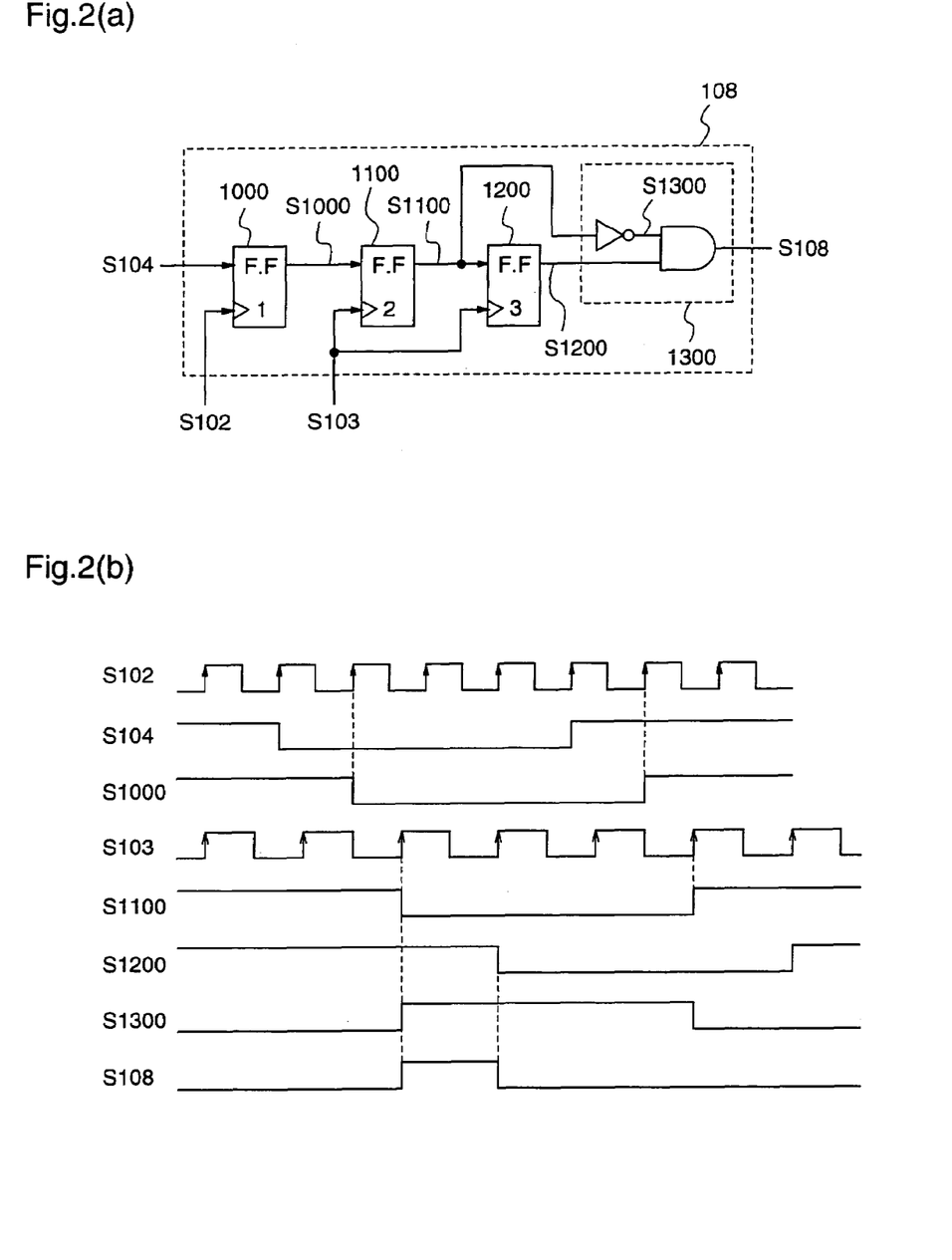

FIG. 2(a) is a block diagram illustrating the construction of the clock switch circuit 108 in the video signal processing apparatus according to the first embodiment, and FIG. 2(b) is a diagram illustrating waveforms of signals inputted and outputted to/from the clock switch circuit 108 in the video signal processing apparatus according to the first embodiment.

In FIG. 2(a), the horizontal sync signal S104 inputted to the clock switch circuit 108 is input to the first flip-flop 1000 which is operated with the first clock S102. An output S1000 from the first flip-flop 1000 is input to the second flip-flop 1100 which is operated with the second clock S103, and the horizontal sync signal S1100 synchronized with the second clock S103 is obtained. The horizontal sync signal S1100 is input to the third flip-flop 1200 which is operated with the second clock S103, and the horizontal sync signal S1200 that is delayed by a period equivalent to the second clock S103 is obtained. Then, an inversion signal S1300 of the horizontal sync signal S1100 and the horizontal sync signal S1200 are ANDed, thereby obtaining the horizontal sync signal S108 equivalent to one-clock width of the second clock S103, which is switched to the second clock S103.

In this way, the horizontal sync signal S104 is switched from the first clock S102 to the second clock S103 by the first flip-flop 1000 and the second flip-flop 1100, and change points of the second clock S103 are detected by the differentiation circuit comprising the third flip-flop 1200 and the logic gate 1300. FIG. 2(b) shows the case where rising edges of the second clock S103 are detected.

Next, the second clock generation circuit in the video signal processing circuit according to the first embodiment will be described in more detail.

Figure 3:
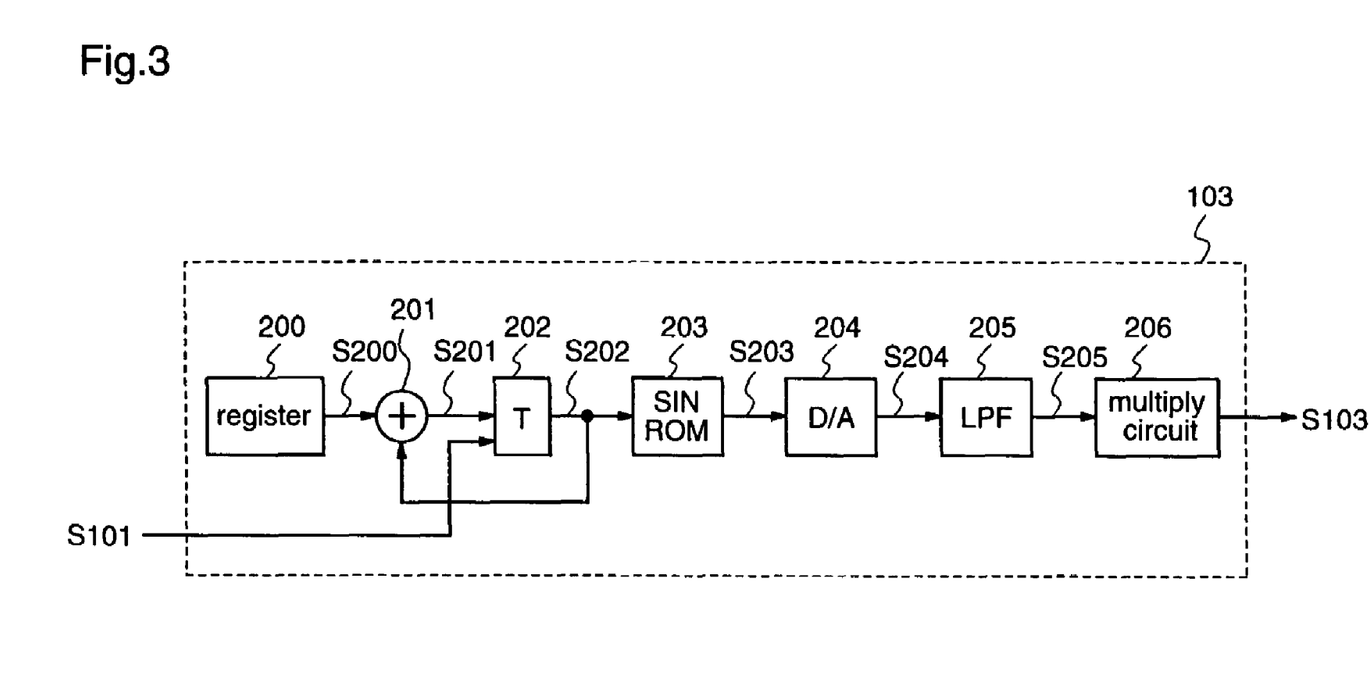
FIG. 3 is a block diagram illustrating the structure of a clock generation circuit in the first video signal processing apparatus according to the first embodiment.

FIG. 3 is a block diagram illustrating the construction of the second clock generation circuit 103 in the video signal processing circuit according to the first embodiment.

With reference to FIG. 3, the video signal processing circuit comprises a register 200, an addition circuit 201, a flip-flop 202, a ROM 203 in which sinusoidal data or periodical data are stored, a D/A converter 204, a filter processing circuit 205, and a multiply circuit 206.

In contrast to the conventional clock generation circuit, the clock generation circuit of the present invention has no reset circuit, and no horizontal sync signal is input to the clock generation circuit.

Figure 4A:
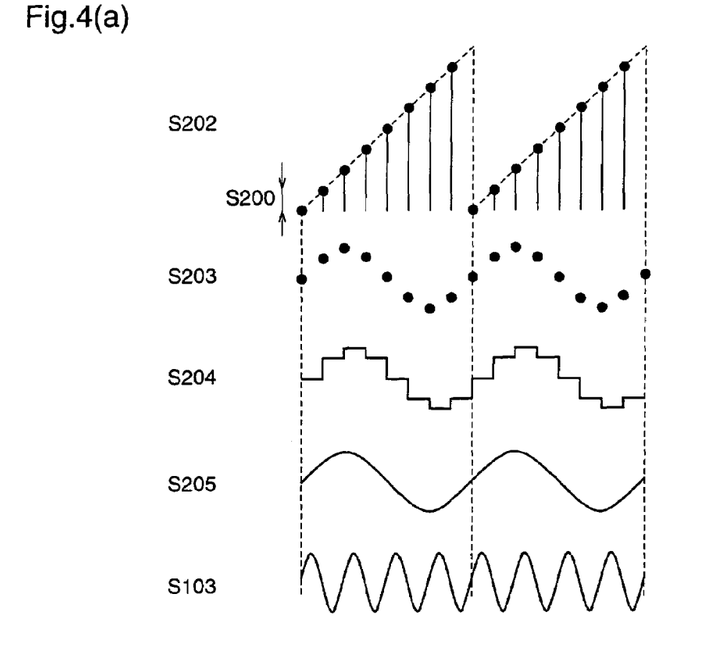
Figure 4B:
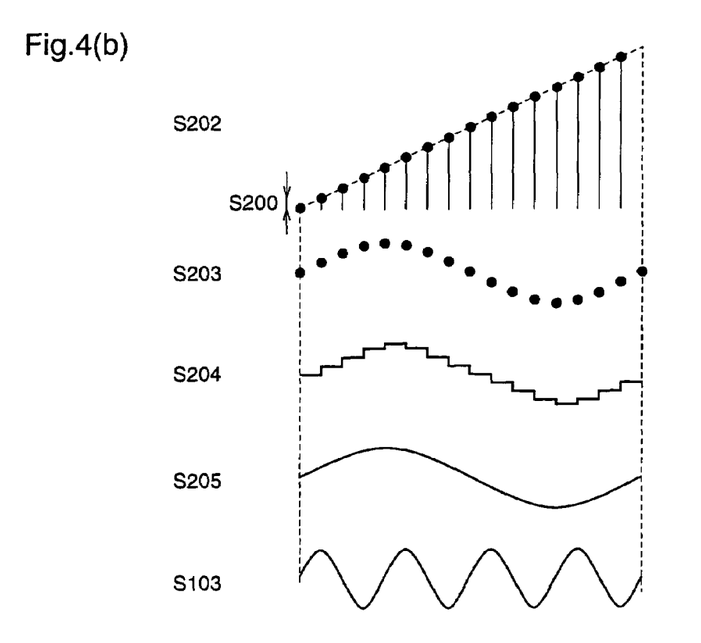

FIGS. 4(a) and 4(b) are timing charts of the respective signals generated by the second clock generation circuit 103 of the video signal processing apparatus according to the first embodiment, and the second clock generation circuit 103 generates different clock frequencies in FIG. 4(a) and FIG. 4(b), respectively. Although the frequency required in the video signal processing apparatus differs depending on the type of the panel connected to the apparatus, it is possible to generate different clock frequencies by varying the set value of the register 200.

The operation of the second clock generation circuit 103 according to the first embodiment will be described with reference to FIG. 4.

The flip-flop 202 performs addition and accumulation of the set value S200 by the addition circuit 201 at every rising edge of the reference clock S101, thereby obtaining a cumulative value S202. The cumulative value S202 is inputted as an address value to the ROM 203 in which sign waveform data is stored, and data S203 is read from the ROM 203 according to the address value. The read data S203 is input to the D/A converter 204 and converted into an analog signal S204. Since this analog signal S204 contains quantization noises and the like, quantization noises and harmonic components are removed from the analog signal S204 by the filter processing circuit 205 to obtain the analog signal S205, and the analog signal S205 is multiplied by N using the multiply circuit 206. N is an integer, and FIG. 4 shows the case where N=4.

As described above, according to the first embodiment, address values are output from the counter comprising the addition circuit 201 and the flip-flop 202, and the data previously written in the ROM 203 are read out on the basis of the address values. Therefore, continuous clocks can be outputted, and further, the clock duty can be kept constant while maintaining the High period and the Low period of the clock being of the same length.

According to the first embodiment, in the clock generation circuit 103, quantization noise is reduced using the filter processing circuit 205 to shape the waveform. However, the filter processing circuit 205 can be dispensed with when the reference clock frequency S101 outputted from the clock oscillation circuit 101 is higher than the frequency of the analog signal S204 and influence of the quantization noise is insignificant.

As described above, the video signal processing apparatus according to the first embodiment of the present invention is provided with the first clock generation circuit 102 for generating a first clock S102 synchronized with an input signal, a second clock generation circuit 103 for generating a second clock S103 according to the resolution of the pixel display, and the clock switch circuit 108 for generating a sync signal S108 that is switched to the second clock S103 by using a sync signal S104 generated by the first clock S102. Therefore, when the horizontal sync signal is converted from the first clock to the second clock that drives the image display device, even if a non-standard signal of VTR or the like is inputted, the cycle of the clock to be used for processing after memory reading is not shortened, and the cycle can be kept constant, thereby avoiding timing error in video processing using the second clock. Further, it is possible to constitute a system which does not use a high-power multiply PLL that requires a lot of man-hours for designing and verification, and establish a system which requires no considerations on influences by jitter and the like.

Embodiment 2

Next, a video signal processing apparatus according to a second embodiment of the present invention will be described.

Figure 5:
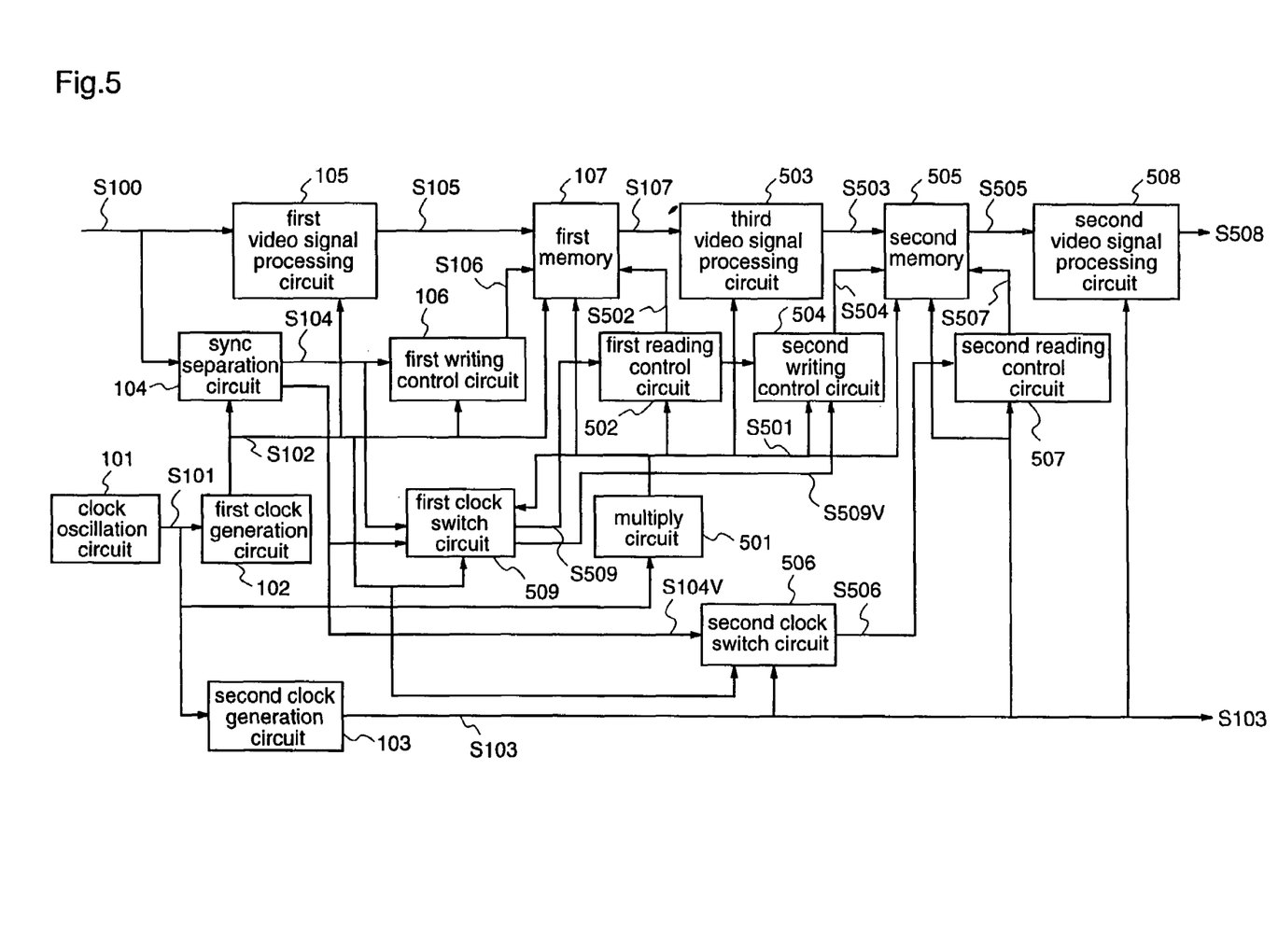
FIG. 5 is a block diagram illustrating the whole structure of a video signal processing apparatus according to a second embodiment of the present invention.

FIG. 5 is a block diagram illustrating an example of a construction of a video signal processing apparatus according to the second embodiment.

With reference to FIG. 5, the video signal processing apparatus according to the second embodiment is provided with a clock oscillation circuit 101, a first clock generation circuit 102, a second clock generation circuit 103, a sync separation circuit 104, a first video signal processing circuit 105, a first writing control circuit 106, a first memory 107, a first clock switch circuit 509, a multiply circuit 501, a first reading control circuit 502, a third video signal processing circuit 503, a second writing control circuit 504, a second memory 505, a second clock switch circuit 506, a second reading control circuit 507, and a second video signal processing circuit 508. The same constituents as those of the video signal processing circuit according to the first embodiment are given the same reference numerals and, therefore, repeated description is not necessary.

The multiply circuit (third clock generation circuit) 501 multiplies the reference clock S101 by M to obtain a third clock S501. M is an integer. For example, when the frequency of the reference clock S101 is 10 MHz, a multiple such as 4 times or 8 times is set so that the frequency of the third clock S501 becomes higher than the frequencies of the first clock S102 and the second clock S103.

The third clock S501 is connected to the reading clock of the first memory 107, the first reading control circuit 502 corresponding to the first memory 107, the third video signal processing circuit 503, the second writing control circuit 504 corresponding to the second memory 505, the writing clock of the second memory 505, and the first clock switch circuit 509.

The sync separation circuit 104 outputs a horizontal sync signal S104 synchronized with the inputted video signal S100. Further, the horizontal sync signal S104 is switched to the third clock S501 by the first clock switch circuit 509.

Figure 6:
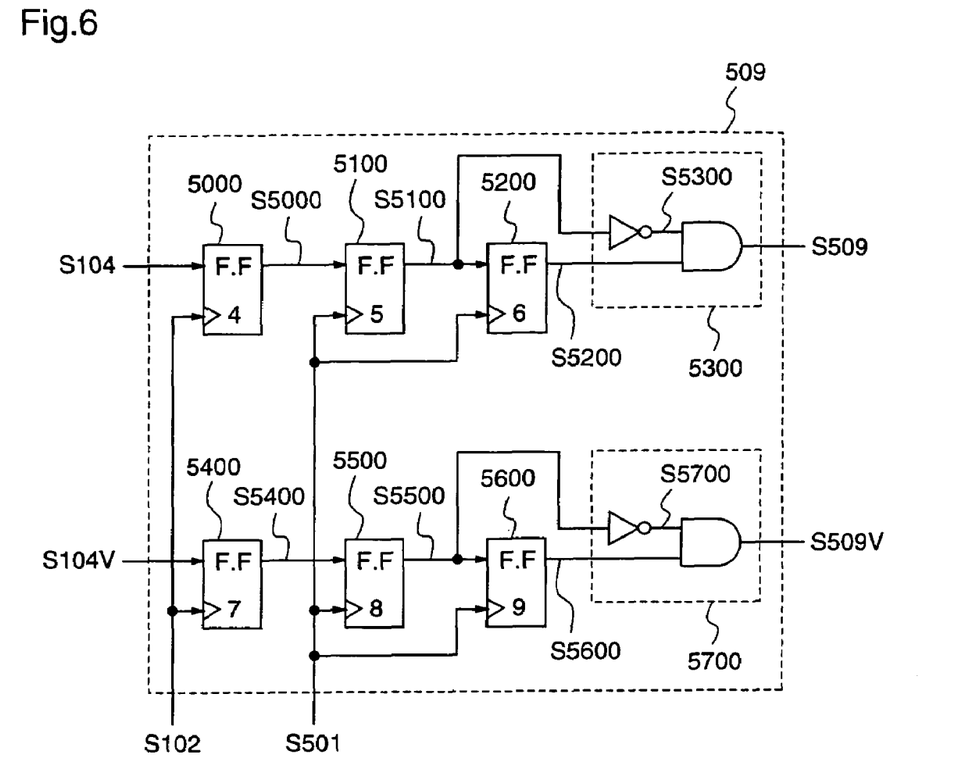
FIG. 6 is a block diagram illustrating the structure of a first clock switch circuit in the video signal processing apparatus according to the second embodiment.

FIG. 6 is a block diagram illustrating the construction of the first clock switch circuit 509 in the video signal processing apparatus according to the second embodiment.

In FIG. 6, the horizontal sync signal S104 inputted to the clock switch circuit 509 is input to a fourth flip-flop 5000 that is operated by the first clock S102. The output S5000 of the fourth flip-flop 5000 is input to a fifth flip-flop 5100 that is operated by the third clock S501, and a signal S5100 synchronized with the third clock S501 is obtained. The signal S5100 is input to a sixth flip-flop 5200 that is operated by the third clock S501, and a signal S5200 that is delayed by the third clock S501 is obtained. An inversion signal S5300 of the signal S5100 and the signal S5200 are ANDed to obtain a horizontal sync signal equivalent to one-clock width of the third clock S501, which is switched to the third clock S501.

Further, a vertical sync signal S104V inputted to the clock switch circuit 509 is input to a seventh flip-flop 5400 that is operated with the first clock S102. An output S5400 of the seventh flip-flop 5400 is input to an eighth flip-flop 5500 that is operated with the third clock S501, and a signal S5500 synchronized with the third clock S501 is obtained. The signal S5500 is input to a ninth flip-flop 5600 that is operated with the third clock S501, and a signal S5600 that is delayed by the third clock S501 is obtained. An inversion signal S5700 of the signal S5500 and the signal S5600 are ANDed to obtain a vertical sync signal S509V equivalent to one-clock width of the third clock S501, which is switched to the third clock S501.

As described above, the first clock switch circuit 509 performs differentiation using the third clock S501 which is closest to a rising edge or a falling edge of the inputted sync signal S104 so that the result of differentiation becomes one-clock width of the third clock S501, whereby the horizontal sync signal S509 switched to the third clock S501 is obtained, and the signal S509 is input to the first reading control circuit 502 and delayed so that memory writing and memory reading do not overlap, and thereafter, the video signal S107 is read from the first memory 107 with the third clock S501.

The video signal S107 which is read from the first memory 107 is input to the third video signal processing circuit 503 according to the control signal S502 outputted from the first reading control circuit 502. In the third video signal processing circuit 503, number-of-pixel conversion in the horizontal direction and number-of-pixel conversion in the vertical direction are carried out, whereby the number of pixels of the video signal is converted into the number of pixels of the pixel display, and a resultant video signal S503 is outputted. The video signal S503 is written in the second memory 505 according to the control signal S504 from the second writing control circuit 504. Then, the vertical sync signal S509V that is switched to the third clock S501 by the first clock switch circuit 509 is input to the second writing control circuit 504, and the video signal S503 is written in the second memory 505 with the third clock S501.

Further, using the vertical sync signal S104V synchronized with the video signal S100 inputted to the sync separation circuit 104, the second clock switch circuit 506 performs differentiation using the second clock S103 that is closest to a rising edge or a falling edge of the vertical sync signal S104V so that the result of differentiation becomes one-clock width of the second clock S103, and the vertical sync signal S506 that is switched to the second clock is input to the second reading control circuit 507 and delayed so that memory writing and memory reading do not overlap, and thereafter, the video signal S505 is read from the second memory 505 with the second clock S103. The read video signal S505 is subjected to video processing and adjustment by the second video signal processing circuit 508, whereby a video signal S508 is outputted.

While in this second embodiment the third clock S501 is generated by the multiply circuit 501, the second clock frequency of about 25 MHz is used when the first clock is, for example 4 fsc (14.32 MHz) and the video signal is displayed on a liquid crystal panel based on VGA. In this case, since the frequency of the second clock S103 is larger than the frequency of the first clock S102, the second clock S103 may be used instead of the third clock S501. On the other hand, when the frequency of the second clock S103 is smaller than the frequency of the first clock S102, since clock inputting is fast and clock outputting is slow, number-of-line conversion will be delayed from the fast clock inputting, and therefore, the second clock S103 cannot be used as the third clock S501. Accordingly, as described in the second embodiment, the third clock S501 which is higher than the first clock S102 and the second clock S103 is generated by the multiply circuit 501.

As described above, the video signal processing apparatus according to the second embodiment is provided with the first clock generation circuit 102 for generating a first clock S102 synchronized with an input signal by using a reference clock S101 outputted from the clock oscillation circuit 101; a second clock generation circuit 103 for generating a second clock S103 according to the resolution of a pixel display; the multiply circuit 501 for multiplying the reference clock S101 by M (M: integer) to generate a third clock S102; the first clock switch circuit 509 for generating a sync signal S108 that is switched to the third clock S501 by using the sync signal S104 generated with the first clock S102; and the second clock switch circuit 506 for generating a sync signal S506 by switching the sync signal S104 generated with the first clock S102, to the second clock S103. Therefore, when converting the horizontal sync signal from the first clock through the third clock to the second clock that operates the video display unit, even if a non-standard signal of VTR or the like is inputted, the cycles of clocks used for processings after memory reading can be kept constant without being shortened, thereby avoiding timing errors in the second clock video processing.

Further, it is possible to constitute a system which does not use a high-power multiply PLL that requires a lot of man-hours for designing and verification, and further, it is possible to establish a system which requires no considerations on influences by jitter and the like.

Further, in this second embodiment, when generating the third clock, the reference clock outputted from the first clock oscillation circuit 101 used for generating the first clock is used. However, another clock oscillation circuit different from the first clock oscillation circuit may be provided. By using a second reference clock outputted from the other clock oscillation circuit, it is possible to generate the third clock of the highest frequency independent of the first clock oscillation circuit.

APPLICABILITY IN INDUSTRY

A video signal processing apparatus according to the present invention is useful as a video signal processing apparatus provided with a clock generation circuit for generating a clock for a pixel display such as a liquid crystal display or a plasma display. Further, it is useful as an apparatus for processing video on a pixel display such as a liquid crystal television or a plasma television for converting the resolution in the horizontal direction or the vertical direction according to the resolution of a display screen or the format of an input video signal. Further, it can be applied to use for display format conversion of a television receiver such as a Braun tube television.

The invention claimed is:

1. A video signal processing apparatus comprising:
a first clock generation circuit for generating a first clock synchronized with an input signal;
a first video signal processing circuit for performing video signal processing using the first clock;
a second clock generation circuit for generating a second clock according to a resolution of a pixel display;
a writing control circuit for controlling writing of data into a memory by the first clock;
a clock switch circuit for generating a sync signal that is switched to the second clock, using the sync signal generated with the first clock;
a reading control circuit for controlling reading of data outputted from the memory, using the second clock; and
a second video signal processing circuit for performing video signal processing using the second clock;
wherein
said second clock generation circuit comprises:
an accumulation circuit for inputting a set value as a reference of an output frequency, and adding the set value for each reference clock;
a memory for previously storing sinusoidal data or periodical data, and taking out the data according to an output value of the accumulation circuit;
a D/A converter for converting the output data from the memory into an analog signal;
a filter processing circuit for reducing quantization noise in the analog signal; and
a multiply circuit for multiplying, by N (N: integer), a signal which has periodicity and is output from the filter processing circuit; and
said second clock generation circuit generates a second clock.

2. A video signal processing apparatus comprising:
a first clock generation circuit for generating a first clock synchronized with an input signal, using a reference clock outputted from a clock oscillation circuit;
a first video signal processing circuit for performing video signal processing using the first clock;

a second clock generation circuit for generating a second clock according to a resolution of a pixel display;

a third clock generation circuit for generating a third clock by multiplying the reference clock by M (M: integer);

a first writing control circuit for controlling writing of data into a first memory by the first clock;

a first clock switch circuit for generating a sync signal that is switched to the third clock, using the sync signal generated with the first clock;

a first reading control circuit for controlling reading of data from the first memory by the third clock;

a third video signal processing circuit for performing video signal processing using the third clock;

a second writing control circuit for controlling writing of data into the second memory by the third clock;

a second clock switch circuit for generating a sync signal by switching the sync signal generated by the first clock to the second clock;

a second reading control circuit for controlling reading of data from the second memory by the second clock; and a second video signal processing circuit for performing video signal processing using the second clock.

3. A video signal processing apparatus as defined in claim 2 wherein said second clock generation circuit comprises:

an accumulation circuit for inputting a set value as a reference of an output frequency, and adding the set value for each reference clock;

a memory for previously storing sinusoidal data or periodical data, and taking out the data according to an output value of the accumulation circuit;

a D/A converter for converting the output data from the memory into an analog signal;

a filter processing circuit for reducing quantization noise in the analog signal; and a multiply circuit for multiplying, by N (N: integer), a signal which has periodicity and is output from the filter processing circuit; and said second clock generation circuit generates a second clock.

4. A video signal processing apparatus comprising:

a first clock generation circuit for generating a first clock synchronized with an input signal, using a first reference clock outputted from a clock oscillation circuit;

a first video signal processing circuit for performing video signal processing using the first clock;

a second clock generation circuit for generating a second clock according to a resolution of a pixel display;

a third clock generation circuit for generating a third clock by multiplying a second reference clock outputted from a second clock oscillation circuit by L (L: integer);

a first writing control circuit for controlling writing of data into a first memory by the first clock;

a first clock switch circuit for generating a sync signal that is switched to the third clock, using the sync signal generated with the first clock;

a first reading control circuit for controlling reading of data from the first memory by the third clock;

a third video signal processing circuit for performing video signal processing using the third clock;

a second writing control circuit for controlling writing of data into the second memory by the third clock;

a second clock switch circuit for generating a sync signal that is switched to the second clock, using the sync signal generated by the first clock;

a second reading control circuit for controlling reading of data from the second memory by the second clock; and a second video signal processing circuit for performing video signal processing using the second clock.

5. A video signal processing apparatus as defined in claim 4 wherein said second clock generation circuit comprises:

an accumulation circuit for inputting a set value as a reference of an output frequency, and adding the set value for each reference clock;

a memory for previously storing sinusoidal data or periodical data, and taking out the data according to an output value of the accumulation circuit;

a D/A converter for converting the output data from the memory into an analog signal;

a filter processing circuit for reducing quantization noise in the analog signal; and a multiply circuit for multiplying, by N (N: integer), a signal which has periodicity and is output from the filter processing circuit; and said second clock generation circuit generates a second clock.

* * * * *